Oct. 14, 1969   L. B. LEFFINGWELL ETAL   3,472,022
IMPLEMENT FOR REPAIRING CRAWLER TYPE TRACK
Filed July 19, 1967
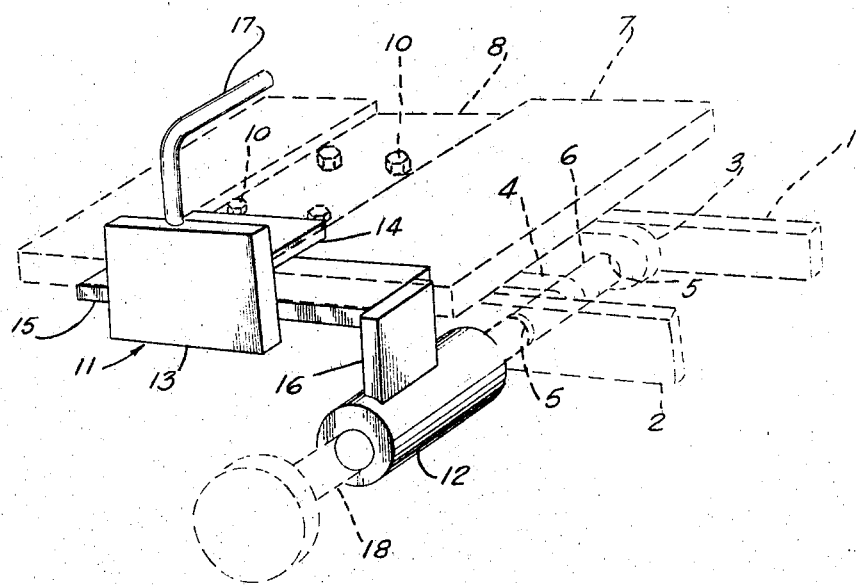
INVENTORS
LINDA P CHAFFEE
LAWRENCE B. LEFFINGWELL &
RICHARD A. TAYLOR
BY
Harry S. Boyd
ATTORNEY

3,472,022
IMPLEMENT FOR REPAIRING CRAWLER TYPE TRACK

Lawrence B. Leffingwell, Inglewood, Calif. (22115 Placeritos Blvd., Newhall, Calif. 91321); Richard A. Taylor, P.O. Box 299, Marshall, Tex. 75670; and Linda P. Chaffee, Dearborn, Mich.
Filed July 19, 1967, Ser. No. 656,981
(Filed under Rule 47(a) and 35 U.S.C. 116)
Int. Cl. B21l 9/06; B25b 27/14
U.S. Cl. 59—7                                    3 Claims

ABSTRACT OF THE DISCLOSURE

This disclosure relates to the field of implements for repairing the tracks of crawler type vehicles.

---

The invention described herein may be manufactured and used by or for the Government for governmental purposes without the payment to us of any royalty thereon.

BACKGROUND OF THE INVENTION

Field of the invention

More particularly this invention relates to a tool to be used in removing and replacing the pivot pins of a track.

Description of the prior art

The individual track links of conventional crawler type vehicles are connected to each other by pivot pins. When it is necessary to remove or replace a track, or one of its components, in the field the task of removing or replacing pivot pins is customarily performed by two men. One holds a drift pin against the pivot pin and a second man strikes the drift pin with a sledge driving the pivot pin into or out of engagement with the track links. This procedure is inefficient and somewhat dangerous to the man holding the drift pin. Special tools of various kinds have been designed for use in the field but have proven so cumbersome and difficult to employ that most workers continue to use the old hand-held drift pin and sledge method.

SUMMARY OF THE INVENTION

This invention relates to a repair jig useful to remove and replace track pivot pins.

Accordingly, an object of this invention is to provide a track repair jig which will enable a single worker using a drift pin and sledge to remove and replace the pivot pins of a crawler type track.

DESCRIPTION OF THE DRAWINGS

The nature and preferred form of the invention and other objects and advantages will appear from the description which follows and the drawing in which:

The figure shows, in perspective the track repair jig in place and ready for use on a portion of vehicle track.

DESCRIPTION OF THE PREFERRED EMBODIMENT

The conventional crawler type track, represented in phantom lines in the figure, comprises a plurality of pairs of links 1, 2 and 3, 4. Each link has a circular opening 5 near each of its ends. Adjacent pairs of links are interconnected by a pivot pin 6 which must be forcibly inserted through corresponding openings 5 in each link forming a tight fit therewith. A ground engaging track pad 7 having a central, transverse depressed portion 8 is attached to each pair of links by nut and bolt combinations 10.

The track repair jig comprises generally a track gripping portion 11 and a drift pin guide tube 12 which is aligned with a track pivot pin when the track gripping portion is properly placed on the track.

The track gripping portion 11, which may be fabricated from steel plate, comprises an end plate 13, a rectangular top plate 14 and a rectangular bottom plate 15. The inner faces of the top and bottom plates are parallel to each other and said plates are welded to the end plate and normal thereto. The top and bottom plates are dimensioned and so spaced that track gripping portion 11 can be readily slipped on to ground engaging pad 7 with the top plate 14 received in depressed portion 8 and the bottom plate 15 in loose contact with the bottom of pad 7. The top and bottom plates should project inwardly from end plate 13 sufficiently so that they will abut nut and bolt combinations 10 when the jig is in position.

Drift pin guide tube 12 which may be cut from steel pipe is attached to bottom plate 15 by steel spacing member 16. The bottom plate and spacing member are so dimensioned that when track gripping portion 11 is placed on a track pad, as in FIG. 1, the guide tube 12 is aligned with and its interior end is close to the adjacent track pivot pin 6. The internal diameter of the guide tube 12 is sufficiently large to accommodate either a pivot pin or the drift pin customarily used for track repairs.

A handle 17 attached to end plate 13 is provided to facilitate carrying and placement of the track repair jig.

In use the shank of drift pin 18 is loosely received in guide tube 12 with the drift pins point in contact with pivot pin 6. The pivot pin can be knocked into or out of its place in the track by striking the head of drift pin 18 with a sledge. Although the gripping portion 11 of the jig is not rigidly affixed to the track pad the fit is close enough to preclude any substantial movement of the repair jig. The jig is prevented from twisting sideways by the relatively close fit of top plate 14 against the edges of depressed portion 8 of track pad 7.

From the foregoing it is apparent that modifications may be made in the jig described without departing from the principle of the invention.

We claim:
1. A repair jig for removing and replacing pivot pins from a crawler type track comprising:
   (a) track gripping means adapted to be fitted on to a ground engaging pad of the track;
   (b) a drift pin guide tube; and
   (c) a spacing member interconnecting said track gripping means and said guide tube in spaced relation so that when said gripping means is positioned on a ground engaging pad the drift pin guide tube is aligned with a track pivot pin adjacent said ground engaging pad.
2. A repair jig for removing and replacing pivot pins from a crawler track, the track being of the type which includes track links interconnected by pivot pins, and ground engaging pads mounted on the track links, the said ground engaging pads having central transverse depressed portions, comprising:
   (a) track gripping means adapted to be slidably received on a ground engaging pad at its depressed portion;
   (b) a drift pin guide tube; and
   (c) a spacing member interconnecting said track gripping means and said drift pin guide tube in spaced relation so that when said gripping means is positioned on a ground engaging pad the drift pin guide tube is aligned with a track pivot pin adjacent said ground engaging pad.

3. A repair jig as described in claim 2 wherein the track gripping means comprises:
(a) a vertical end plate;
(b) a substantially rectanguar top plate, of a width slightly less than the width of the transverse depressed portion of a ground engaging pad, affixed to said vertical end plate and normal thereto;
(c) a substantially rectangular bottom plate, spaced from said top plate a distance slightly greater than the thickness of a ground engaging pad at its depressed portion, affixed to said vertical end plate and normal thereto.

References Cited

UNITED STATES PATENTS

| 2,387,551 | 10/1945 | Abramson | 59—7 |
| 2,392,251 | 1/1946 | Matthews | 59—7 |
| 3,075,347 | 1/1963 | Bonifas | 59—7 |

CHARLES W. LANHAM, Primary Examiner

G. P. CROSBY, Assistant Examiner

U.S. Cl. X.R.

29—275